United States Patent [19]

Haga

[11] Patent Number: 5,189,349
[45] Date of Patent: Feb. 23, 1993

[54] DRIVE CIRCUIT FOR MULTI-PHASE BRUSHLESS DC MOTOR INCLUDING DRIVE CURRENT DETECTOR

[75] Inventor: Hiroyuki Haga, Tokyo, Japan

[73] Assignee: Kabushiki Kaisha Toshiba, Kawasaki, Japan

[21] Appl. No.: 738,521

[22] Filed: Jul. 31, 1991

[30] Foreign Application Priority Data

Aug. 2, 1990 [JP] Japan .................... 2-203839

[51] Int. Cl.$^5$ .......................... H02P 5/00
[52] U.S. Cl. .................... 318/254; 388/806; 318/257
[58] Field of Search .............. 318/254, 138, 439, 257, 318/268, 59; 388/815, 806, 821-823, 915, 928.1

[56] References Cited

U.S. PATENT DOCUMENTS

| | | | |
|---|---|---|---|
| 4,642,537 | 2/1987 | Young | 318/254 |
| 4,654,566 | 3/1987 | Erdman | 318/138 X |
| 4,743,815 | 5/1988 | Gee et al. | 318/254 |
| 4,928,043 | 5/1990 | Plunkett | 318/254 |
| 4,942,344 | 7/1990 | Devitt et al. | 318/254 |

Primary Examiner—A. Jonathan Wysocki
Attorney, Agent, or Firm—Finnegan, Henderson, Farabow, Garrett and Dunner

[57] ABSTRACT

According to this invention, there is provided a drive circuit for a multi-phase brushless DC motor comprising a rotational position detector for detecting a rotational position of a rotor of the motor, a commutation control device for selecting a drive coil to be conducted from the plurality of drive coils, a drive output circuit for supplying a drive current to the drive coil selected by the commutation control devices, a DC servo control loop for detecting a motor speed on the basis of a counter electromotive voltage by rotating the motor and by supplying the drive current from the drive output circuit to the motor, and generating a comparison output in accordance with a difference between the motor speed detection output level and the reference voltage to output the comparison output to the drive output circuit through the commutation control device, and a control device for detecting whether the drive current of the drive output circuit is a predetermined value or more and for weakening a control force of the DC servo control loop when the drive current is the predetermined value or more.

1 Claim, 4 Drawing Sheets

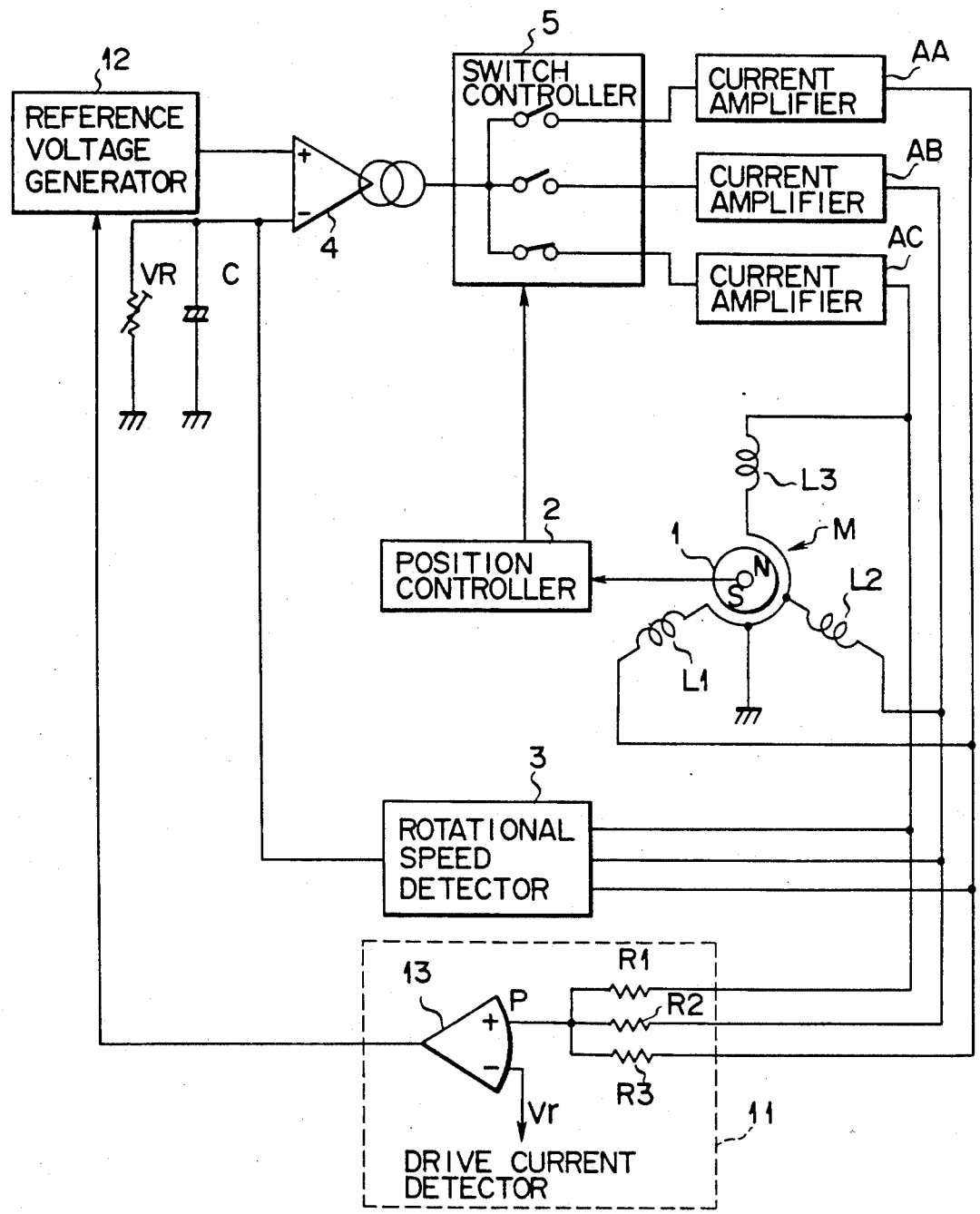
F I G. 6

1

DRIVE CIRCUIT FOR MULTI-PHASE BRUSHLESS DC MOTOR INCLUDING DRIVE CURRENT DETECTOR

BACKGROUND OF THE INVENTION

1. Field of the Invention

The present invention relates to a drive circuit for a multi-phase brushless DC motor and, more particularly, to a DC motor drive circuit capable of reliably reversing the rotation of a motor.

2. Description of the Related Art

FIG. 1 shows a conventional three-phase brushless DC motor M and an integrated drive circuit. In the DC motor M, reference numeral 1 denotes a rotor constituted by a rotatably supported magnet, and reference symbols $L_1$ to $L_3$ denote three-phase drive coils. In the motor drive circuit, reference numeral 2 denotes a position detector for performing a predetermined calculation of the induction voltage waveforms of the three-phase drive coils $L_1$ to $L_3$ to detect the rotational position of the rotor 1; 3, a rotational speed detector for detecting a motor speed on the basis of counter electromotive voltages generated by the three-phase drive coils $L_1$ to $L_3$; 4, a comparator for comparing a detection output level of the rotational speed detector 3 with a reference voltage Vref to generate a comparison output in accordance with the difference between the output level and the reference voltage Vref; and 5, a commutation control circuit for selecting a drive coil to be conducted from the three-phase drive coils $L_1$ to $L_3$ in accordance with the position detection output from the position detection circuit 2. Reference symbols AA to AC denote current amplifiers (drive output circuits) for receiving the comparison output of the comparator 4 through the commutation control circuit 5 and supplying a drive current corresponding to an input level to the drive coil selected by the commutation control circuit 5.

The comparator 4 is constituted by a voltage comparator having a voltage/current converting function. The reference voltage Vref is input to the non-inverting input terminal (+) of the comparator 4, the detection output of the rotational speed detector 3 is input to the inverting input terminal (−), and a semifixed resistor VR and a capacitor C are parallelly connected between the inverting input terminal (−) and a ground potential. The rotational speed detector 3 and the comparator 4 constitute a DC servo control loop. In addition, the commutation control circuit 5 is arranged as described in Published Unexamined Japanese Patent Application No. 48-172994, Japanese Patent Application No. 63-79359 which was filed by the present applicant, or the like.

An operation of the three-phase brushless DC motor drive circuit having the above arrangement wil be described below with reference to the waveforms shown in FIGS. 2 to 5.

FIG. 2 shows commutation timings (a phase difference between the three phases is 120°) of the three-phase coils $L_1$ to $L_3$ when the rotor is rotated in a forward direction and waveforms of counter electromotive voltages generated by the coils by supplying a drive current to the coils. FIG. 3 shows commutation timings of the three-phase drive coils $L_1$ to $L_3$ in the forward rotation of the motor and waveforms of counter electromotive voltages $e_1$ to $e_3$ respectively generated by the drive coils $L_1$ to $L_3$. When a switch $S_1$ of the commutation control circuit 5 is turned on, a drive current is supplied from the current amplifier AA to the drive coil $L_1$. When a switch $S_2$ is turned on, a drive current is supplied from the current amplifier AB to the drive coil $L_2$. When a switch $S_3$ is turned on, a drive current is supplied from the current amplifier AC to the drive coil $L_3$. In this case, the drive currents are supplied to the drive coils $L_1$ to $L_3$ at the corresponding peak portions of the waveforms of the counter electromotive voltages $e_1$ to $e_3$. The amplitudes of the counter electromotive voltages $e_1$ to $e_3$ are increased proportionally to the revolutions of the motor. The rotational speed detector 3 generates a current Isc proportional to the motor speed on the basis of the counter electromotive voltages generated by the three-phase drive coils $L_1$ to $L_3$, and the current Isc flows into the semifixed resistor VR. Since the reference voltage Vref is input to the non-inverting input terminal (+) of the comparator 4, the inverting input terminal (−) receives a feedback input such that the voltage drop across the semifixed resistor VR becomes equal to the reference voltage Vref When the motor speed is to be decreased, the current Isc is decreased to reduce the voltage drop across the semifixed resistor VR. For this reason, the output from the comparator (voltage comparator having a voltage/current converting function) 4 is decreased to be lower than the reference voltage Vref of the non-inverting input terminal (+) so as to increase a current supplied to the commutation control circuit 5. Therefore, the drive currents of the three-phase drive coils $L_1$ to $L_3$ are increased to prevent a decrease in motor speed, i.e., a DC servo control operation is performed. At this time, when the value of the semifixed resistor VR is adjusted to change the current Isc, the motor speed can be freely set. Note that the capacitor C is used for smoothing an AC component of a counter electromotive voltage included in the output from the rotational speed detector 3.

The maximum rotational torque of the motor can be obtained when the drive current is supplied to the drive coils $L_1$ to $L_3$ at the corresponding peak portions of the waveforms of the counter electromotive voltages $e_1$ to $e_3$ of the drive coils $L_1$ to $L_3$. As shown in FIG. 2, when the drive current is supplied to the drive coils $L_1$ to $L_3$ at the corresponding timings of turning on the switches $S_1$ to $S_3$ in the commutation control circuit 5, the terminal voltages of the coils $L_1$ to $L_3$ are plotted as indicated by VL1 to VL3 in FIG. 3. Potentials are shifted by a product of a pure resistance component R(R·i) of the drive coils $L_1$ to $L_3$ and a drive current i at the peak portions of the waveforms of the terminal voltages VL1 to VL3.

In order to reverse the rotation of the motor, an order of switching timings of the switches $S_1$ to $S_3$ in the commutation control circuit 5 is reversed, and commutation timings are switched as shown in FIG. 4. When the rotational direction of the motor is changed, if the motor has a large rotational load, the rotation of the motor is immediately reversed because the motor rotation is easily reversed. In general, the rotation of the motor is not rapidly reversed, and the motor tends to be rotated in a direction in which the motor has been rotated. As shown in FIG. 5, timings for supplying the drive current to the drive coils $L_1$ to $L_3$ are shifted from the corresponding peak portions of the waveforms of the counter electromotive voltages $e_1$ to $e_3$ of the drive coils $L_1$ to $L_3$, the rotational torque of the motor is rapidly reduced, and the motor speed is decreased. At this time, when the order of the switching timings is completely changed, the motor starts reverse rotation.

However, when the motor speed tends to decrease, if the DC servo control operation is forcibly performed, a very large drive current (much larger than a drive current obtained during the normal rotation) flows such that a sufficient rotational torque is generated even when the above commutation timing is changed. In this case, the rotation of the motor cannot always be reversed.

As described above, in the conventional DC motor drive circuit, when an order of switching timings of switches in a commutation control means is reversed to reverse the rotation of the motor, if the DC servo control operation is strongly performed, a very large drive current flows in the motor such that a sufficient rotational torque is generated even when the order of switching timings is changed. In this case, the rotation of the motor cannot be always reversed.

SUMMARY OF THE INVENTION

It is an object of the present invention to provide a DC motor drive circuit in which, when an order of switching timings of switches in a commutation control means is reversed to reverse the rotation of a motor, a motor speed is rapidly decreased to reliably reverse the rotation of the motor.

According to the present invention, there is provided a multi-phase brushless DC motor including rotational position detecting means for performing a predetermined calculation of an induction voltage waveform of each of a plurality of drive coils in a DC motor to detect a rotational position of a rotor of the motor, commutation control means for selecting a drive coil to be conducted from the plurality of drive coils in accordance with a position detection output from the rotational position detecting means, a drive output circuit for supplying a drive current corresponding to an input level from the commutation control means to the drive coil selected by the commutation control means, and a DC servo control loop for detecting a motor speed on the basis of a counter electromotive voltage generated by each of the drive coils by rotating the motor and by supplying the drive current from the drive output circuit to the motor, comparing a motor speed detection output level with a reference voltage, and generating a comparison output in accordance with a difference between the motor speed detection output level and the reference voltage to output the comparison output to the drive output circuit through the commutation control means, comprising control means for detecting whether the drive current of the drive output circuit is a predetermined value or more and for weakening a control force of the DC servo control loop when the drive current is the predetermined value or more.

According to the present invention, in a DC motor drive circuit, when an order of switching timings of switches in a commutation control means is reversed to reverse the rotation of a motor, if it is detected that a drive current excessively larger than a drive current in a normal rotation flows into a drive coil, a control force of a DC servo control loop is weakened. Therefore, a rotational torque of the motor is reduced, and the motor speed is rapidly decreased. When the order of switching timings of the switches is completely reversed, the motor starts reverse rotation, and the rotation of the motor is reliably reversed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram showing a DC motor drive circuit according to an embodiment of the present invention.

DETAILED DESCRIPTION OF THE PREFERRED EMBODIMENTS

An embodiment of the present invention will be described below with reference to the accompanying drawings.

Figure 1:
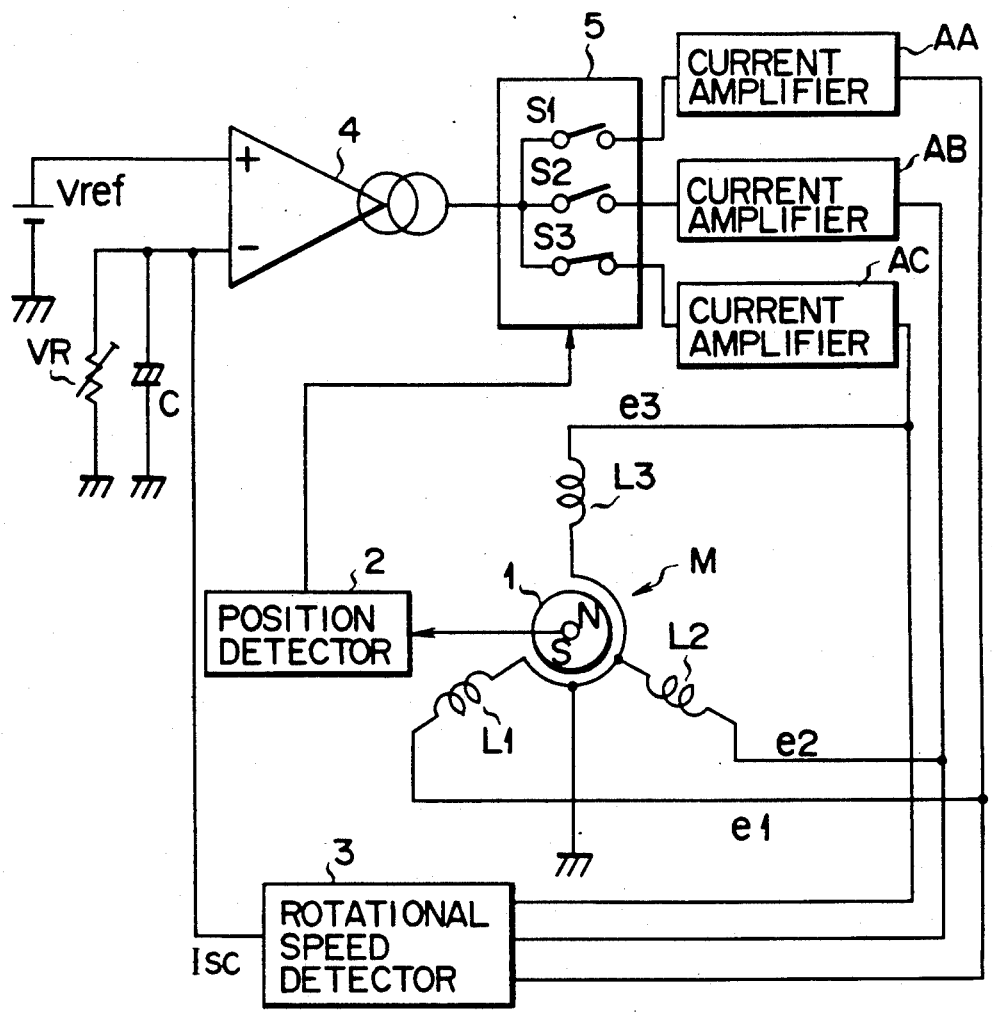
FIG. 1 is a circuit diagram showing a conventional DC motor drive circuit.
Figure 2:
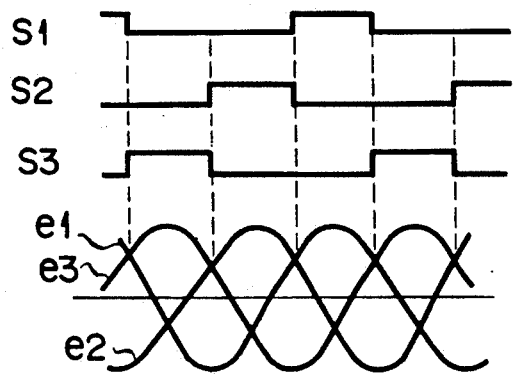
FIG. 2 is a graph showing commutation timings of three-phase drive coils when the rotor is rotated in a forward direction and waveforms of counter electromotive voltages generated by flowing a drive current.
Figure 3:
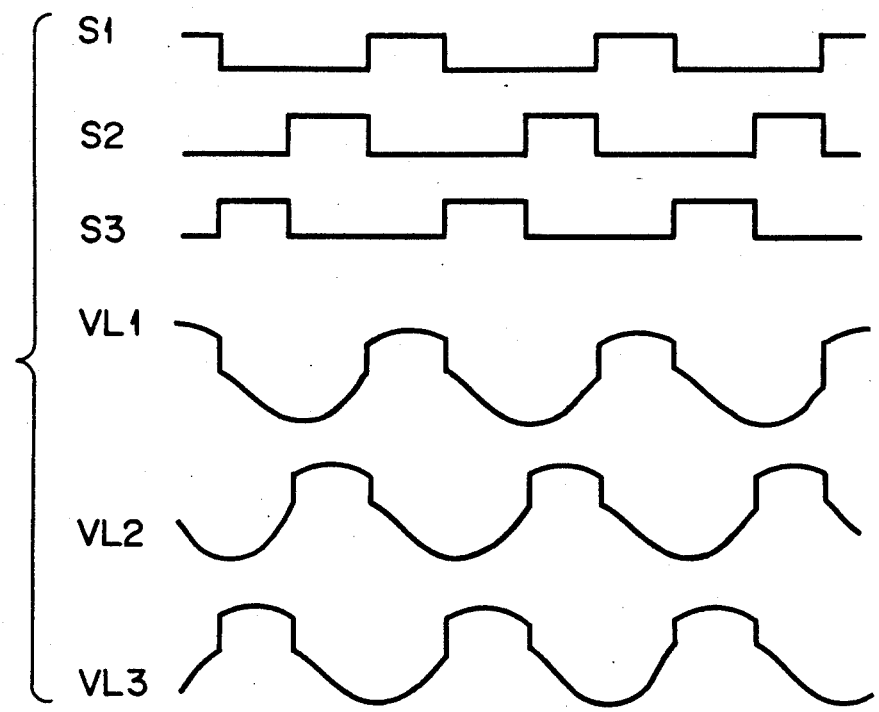
FIG. 3 is a graph showing commutation timings of the three-phase drive coils when the motor is rotated in a forward direction and waveforms of counter electromotive voltages.
Figure 4:
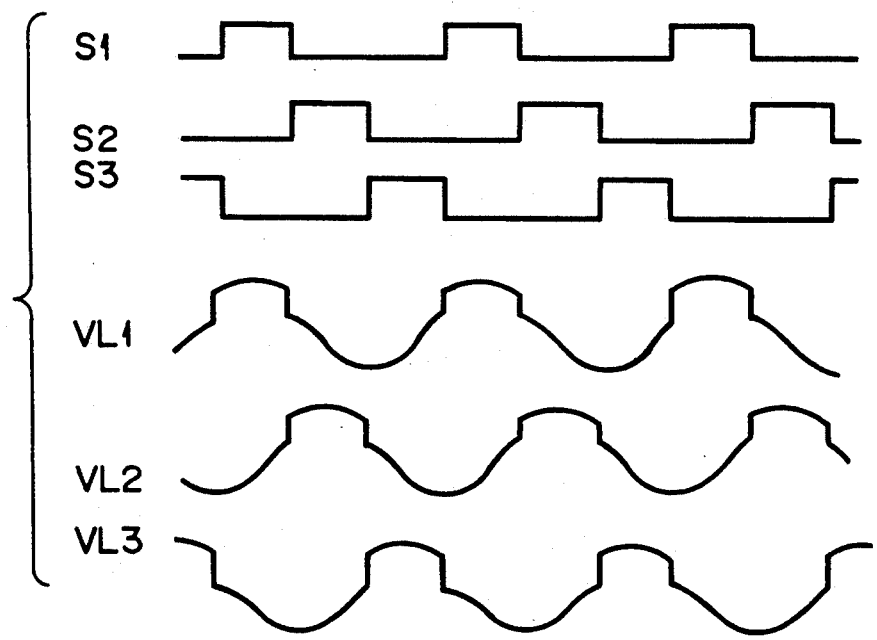
FIG. 4 is a graph showing commutation timings of the three-phase drive coils when the motor is reversely rotated and waveforms of counter electromotive voltages.
Figure 5:
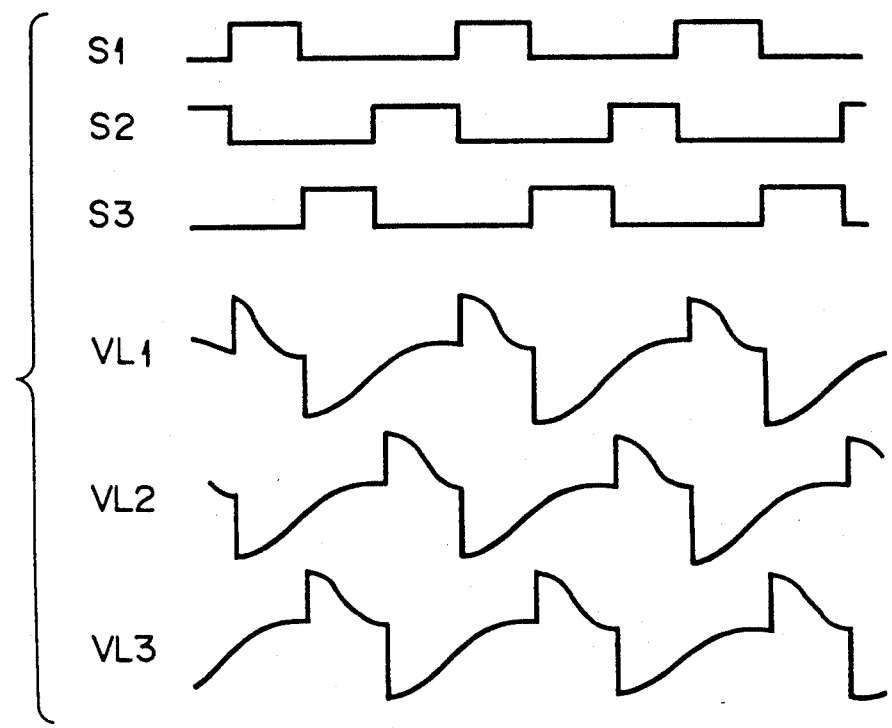
FIG. 5 is a graph showing commutation timings of the three-phase drive coils when the rotational direction of the motor is changed and waveforms of counter electromotive voltages.

FIG. 6 shows a three-phase brushless DC motor M and an integrated DC motor drive circuit. Unlike the conventional DC motor drive circuit described in FIG. 1, the DC motor drive circuit further comprises a control means for detecting whether each of drive currents of current amplifiers AA to AC is a predetermined value or more (a value sufficiently larger than a drive current during normal rotation of the motor) and for weakening a control force for the DC servo control loop (including an OFF state of the DC servo control loop) when the drive currents are the predetermined value or more. The same reference numerals as in FIG. 1 denote the same parts in FIG. 6 except for the above control means, and a description thereof will be omitted.

According to the embodiment of the control means, when the control means detects that each of the drive currents of the current amplifiers AA to AC is the predetermined value or more, a reference voltage Vref to be input to a comparator 4 is changed into a value different from a value obtained during the normal rotation of the motor so as to decrease the output from the comparator 4.

That is, according to this embodiment, the DC motor drive circuit comprises a drive current detector 11 for detecting whether each of the drive currents of the current amplifiers AA to AC is the predetermined value or more, and a reference voltage generator 12 for generating the reference voltage Vref controlled by the detection output from the drive current detector 11 and for inputting the reference voltage Vref to the comparator 4. Ends of drive coil $L_1$ to $L_3$ are commonly connected to the drive current detection circuit 11 through resistors $R_1$ to $R_3$, respectively, to eliminate counter electromotive voltages $e_1$ to $e_3$ so as to extract only an output voltage component (a DC component proportional to the drive current) P. The output voltage component P is compared with a predetermined potential Vr by a voltage comparator 13 to generate an "H"-level or "L"-level comparison output. In this case, the reference potential Vr is set to be an intermediate value between an output voltage component $P_L$ obtained during the normal rotation of the motor and an output voltage component $P_H$ obtained during the reverse of the rotational direction. The reference voltage Vref generated by the reference voltage generator 12 is decreased/increased in accordance with level "H"/"L" of the output from the drive current detector 11.

In the DC motor drive circuit having the above arrangement, when an order of switching timings of switches $S_1$ to $S_3$ in a commutation control circuit 5 is reversed to reverse the rotation of the motor, the drive current detector 11 detects that a drive current sufficiently larger than the drive current during the normal rotation of the motor flows to the drive coils $L_1$ to $L_3$ ("H" level is output). At this time, the reference voltage Vref generated by the reference voltage generator 12 is controlled to be lower than the voltage obtained during the normal rotation of the motor. For this reason, the output level of the comparator 4 is decreased, the drive currents of the drive coils $L_1$ to $L_3$ are decreased, the rotational torque of the motor M is decreased, and the speed of the motor M is rapidly decreased. When the order of the switching timings of the switches $S_1$ to $S_3$ is completely reversed, the motor M starts reverse rotation, and then the rotation of the motor M is reliably reversed.

When the order of switching timings of the switches $S_1$ to $S_3$ in the commutation control circuit 5 is reversed to reverse the rotation of the motor, if the motor has a large rotation load, the motor is easily rotated in the reverse direction, and the rotation of the motor is immediately reversed. At this time, the drive current for the motor is larger than the drive current during the normal rotation of the motor and smaller than the predetermined value, and the drive current detector 11 outputs an "L"-level output. The reference voltage Vref generated by the reference voltage generator 12 is kept as the voltage obtained during the normal rotation of the motor, and the control force of the DC servo control loop is retained as a control force during the normal rotation of the motor.

As described above, according to the present invention, the DC motor drive circuit comprises a control means detecting whether the drive current of a drive output circuit is a predetermined value or more and for controlling the control force of the DC servo control loop to be weakened when the drive current which is the predetermined value or more is detected. Therefore, when an order of switching timings of switches in a commutation controlling means is reversed to the rotation of the motor, the motor speed is rapidly decreased, thereby reliably reversing the rotation of the motor. In addition, the control means also serves as a overcurrent preventing means.

Additional advantages and modifications wil readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A drive circuit for a multi-phase brushless DC motor comprising:

a DC motor having three-phase drive coils and a rotor;

rotational position detecting means for performing a predetermined calculation of an induction voltage waveform of each of said three-phase drive coils to detect a rotational position of said rotor of said DC motor;

commutation control means for selecting a drive coil from said three-phase drive coils in accordance with a position detection output from said rotational position detecting means;

drive output means for supplying a drive current corresponding to an input level from a first comparator by way of said commutation control means to one of said drive coils selected by said commutation control means;

rotational speed detecting means for detecting a motor speed on the basis of counter electromotive voltage generated by each of said drive coils by rotating said motor, and for generating a current which is proportional to said motor speed;

a first resistor for determining a motor speed detection output level on the basis of the current output from said rotational speed detecting means;

said first comparator comparing said motor speed detection output level with a first reference voltage, for generating a comparison output in accordance with a difference between said motor speed detection output level and said first reference voltage, and for supplying said comparison output to said drive output means through said commutation control means;

drive current detecting means comprising a second comparator, and second, third, and fourth resistors, each of said resistors being connected to one of said three-phase drive coils, respectively, and also being commonly connected to a non-inverting input terminal of said second comparator, said input terminal of said second comparator being supplied with a DC component obtained by totaling counter electromotive voltages which are generated by said three-phase drive coils and supplied through said second, third, and fourth resistors, and an inverting input terminal of said second comparator being supplied with a voltage having an intermediate value between an output voltage component obtained during a normal rotation of the motor and an output voltage component obtained during a reverse rotation of the motor; and reference voltage generating means for generating said first reference voltage which is varied in proportion to an output level of said second comparator.

* * * * *